May 23, 1933. J. L. BROWN 1,910,212
ELECTROLYTIC MANUFACTURE OF COLLOIDS
Filed Dec. 13, 1930
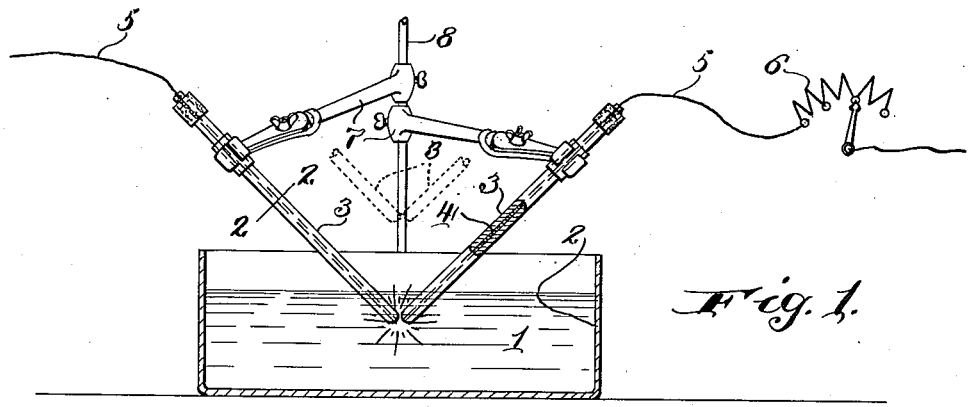
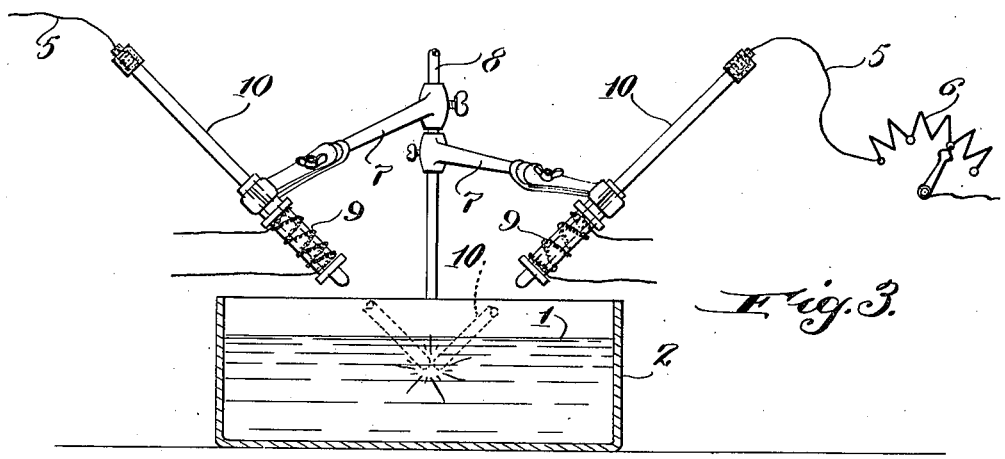
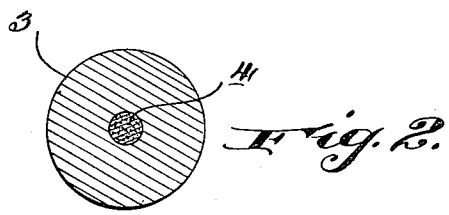
Inventor
John L. Brown
By Thomas W. J. Clark
Attorney Patented May 23, 1933

1,910,212

UNITED STATES PATENT OFFICE

JOHN L. BROWN, OF CATONSVILLE, MARYLAND, ASSIGNOR OF ONE-HALF TO THOMAS O. JONES, OF BALTIMORE, MARYLAND

ELECTROLYTIC MANUFACTURE OF COLLOIDS

Application filed December 13, 1930. Serial No. 502,250.

Hydrosols of metallic elements have long been prepared by arcing electrodes of the metal under water, but this method of preparation for electrically non-conductive elements has not heretofore been possible.

One object of my invention is to prepare a colloidal solution from which pure gels may be separated, and other objects are to produce electrodes of normally electrically non-conductive materials and to prepare from them hydrosols which will yield pure gels. Another object is to produce such gels in a reducing solution, and to have in such solution protecting colloids to prevent and delay oxidation, and to use other means of preventing oxidation. Other objects and advantages of my invention will appear from the following description.

Fig. 1 represents the arcing of electrodes having a conducting center. Fig. 2 is a cross-sectional view of one of the electrodes on line 2—2 of Fig. 1.

Fig. 3 represents an apparatus for heating the electrodes by coils prior to arcing.

Similar numerals refer to similar parts throughout the several views.

Non-metallic elements which are non-conductive at ordinary atmospheric temperatures become conductive on being heated. In carrying out my invention I use an electrode of the material of which I desire to make a colloidal solution, such as a glass tube of say, silicon dioxide, to produce a colloidal solution of silicon, from which the gel may be separated. This tube may be heated quite hot, and it will then be an electrical conductor and can be used as an electrode. A bath or solution of a reducing agent, such as sodium sulphate or sodium sulphite is then prepared, the sulphate reduces with the high temperature employed, and to this bath is added a small amount of a protective colloid to prevent oxidation, such as the organic colloids, gum arabic, glue, albumin, albumose. The electrodes are then arced in this solution, the colloidal silicon forming in the aqueous sodium sulphate or sulphite, and the protective colloid prevents oxidation. The gel is then allowed to settle, and it may be separated out by dialysis or any desired method of precipitation. I prefer to carry out this separating operation after covering the solution or container with paraffin to prevent oxidation by the air.

When oxide electrodes like silica are used the reaction is attended by an electro-chemical change. The oxide is ionized, the oxygen tending to travel to the anode, but being combined with the reducing agent before being allowed to recombine with the silicon. The silicon tends to travel to the cathode, and if kept from exposure to the air and other oxygen, will form a colloid in the liquid then present, called the disperse medium, and the gel is known as the disperse phase. (See Spear's translation of Zsigmondy, "The Chemistry of Colloids" page 27.) Thus the element is always first producted and the final colloid will be determined by the presence or absence of the reducing agent and/or protective colloids.

The heating of the electrode to make it conductive may be done by a direct application of heat, or by using a resistance coil of metal, such as in the Nernst lamp, or in any other desired way, but I find that a tube of the desired material which is to be disintegrated, packed with a concentrated micellen (a colloid containing a conducting medium) of the same material, when initially heated outside the bath by arcing, may then be arced in the bath to produce the best results.

In the drawing, a solution 1, of, say, sodium sulphate, or sodium sulphite, containing a small amount of, say, gum arabic, is placed in a vessel 2. The electrodes 3 of Fig. 1 may be a thick tube of silica, having a line, here shown as a central core 4 of say, silica gel, containing a trace of HCl, such a colloid being conductive and at times being referred to as a micellen. To these cores are attached electric wires 5, with a rheostat 6 in the circuit. The electrodes are held by clamps 7 attached to stand 8. The electrodes are initially heated by passing a current through their cores, out of the bath and arcing them as shown in dotted lines in Fig. 1. After the electrodes have been heated sufficiently by this process to carry a current themselves, a much stronger current is turned on and the electrodes are immersed in the bath and disintegrated by arcing, forming colloidal silicon.

In Fig. 2 I have shown heating coils 9, much like those of a Nernst lamp, through which plain rod electrodes 10, of say silica, may be moved until they are hot enough throughout their length to carry current from wires 5, at which time they may be immersed in the bath and disintegrated by arcing, forming colloidal silicon.

Besides the solutions which I use, in all other solutions used by Bredig, Svedberg, Paul, Patrick and other inventors, my invention will produce results with varied degrees of purity. The impure gel of the colloids so formed may be used for the core of my non-conducting electrodes.

Examples of the use of my invention are:

One, in a solution of 1000 parts of water, 1 part of sodium sulphite, and 2 parts of gum arabic, an oxide of selenium is disintegrated by arcing an electric current of 8 amperes and 20 volts.

Two, in a solution of 80 parts of water, 15 parts of sodium sulphate and 5 parts of glue or gum arabic, silica or zirconium oxide is disintegrated by arcing an electric current of 75 amperes and 200 volts.

The present invention is not limited to the specific details above set forth, which should be construed as illustrative and not by way of limitation, and in view of the numerous modifications which may be effected therein without departing from the spirit and scope of my invention, I desire that only such limitations be imposed as indicated in the appended claims.

I claim:

1. A process of making colloids from substances electrically non-conductive at normal atmospheric temperatures comprising heating an electrode of the desired substance and disintegrating the same by arcing in a solution of a reducing agent.

2. A process of making colloids from substances electrically non-conductive at normal atmospheric temperatures comprising heating an electrode of the desired substance, arcing the same in a solution of a reducing agent containing a protective colloid.

3. A process of making colloids from substances electrically non-conductive at normal atmospheric temperatures comprising heating an electrode of the desired substance and arcing the same in a solution of a reducing agent and a disperse medium.

4. A process of making colloids from substances electrically non-conductive at normal atmospheric temperatures comprising heating an electrode of the desired substance and arcing the same in a solution of a reducing agent and separating the desired colloid.

5. A process of making colloids from substances electrically non-conductive at normal atmospheric temperatures comprising preparing an electrode of the desired substance, adding thereto a line of a conducting colloid of said substance, heating and then disintegrating said electrode by arcing in a disperse medium.

6. A process of making colloids from substances electrically non-conductive at normal atmospheric temperatures comprising preparing an electrode of the desired substance, adding thereto a line of a conducting colloid of said substance, heating said electrode by arcing and disintegrating the same in a solution of a reducing agent.

7. A process of making colloids from substances electrically non-conductive at normal atmospheric temperatures comprising preparing an electrode of the desired substance, adding thereto a line of a conducting colloid of said substance, heating said electrode by arcing and disintegrating the same in a solution of a reducing agent containing a protective colloid.

8. A process of making colloids from substances electrically non-conductive at normal atmospheric temperatures comprising preparing an electrode of the desired substance, adding thereto a line of a conducting colloid of said substance, heating said electrode by arcing and disintegrating the same in a solution of a reducing agent and separating the desired colloid.

9. A process of making colloids from substances electrically non-conductive at normal atmospheric temperatures comprising preparing an electrode of the desired substance, adding thereto a line of a conducting colloid of said substance, heating said electrode by arcing and disintegrating the same in a solution of a reducing agent and separating the desired colloid under an air tight cover.

JOHN L. BROWN.